Jan. 20, 1931.  F. SIMON  1,789,344
EXTENSIBLE LEVEL
Filed Sept. 19, 1928
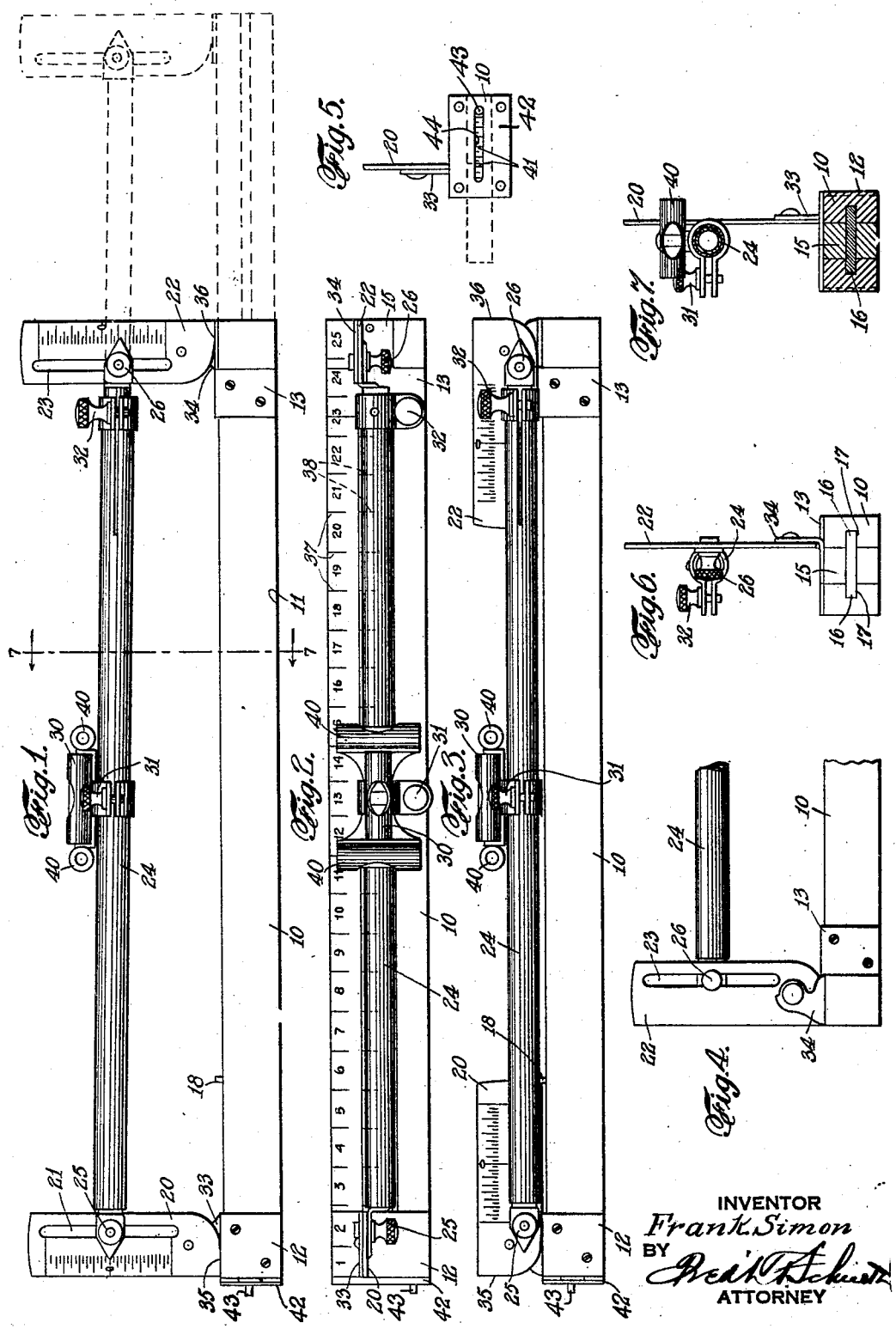
INVENTOR
*Frank Simon*
BY
*[signature]*
ATTORNEY Patented Jan. 20, 1931

1,789,344

UNITED STATES PATENT OFFICE

FRANK SIMON, OF BROOKLYN, NEW YORK

EXTENSIBLE LEVEL

Application filed September 19, 1928. Serial No. 306,792.

The invention relates to a level or clinometer member whereby the extent that an object, upon which the level member may be placed, is out of level may readily be determined.

The invention has for its object a device of this character capable of being adjusted to the desired length, and wherein the spirit-level element employed therein may be correspondingly adjusted. A further object of the invention resides in the provision of means for securing the level extension in adjusted position. The invention has for a still further object the provision of a vertically adjustable spirit-level carrying member whereby the level member may be adjusted for use in setting an object at a predetermined angle from the horizontal, as well as to determine the departure of a surface from the horizontal. Further objects of the invention relate to the provision of a compact level member embodying the foregoing features.

In carrying out the invention, a body member with true horizontal undersurface is provided, the same carrying a slide member which is extensible longitudinally thereof and provided with a scale plate extending at right angles thereto. The body member similarly carries a scale plate; and between the two scale plates is provided a telescoping support adapted to be adjustably secured at its ends to the respective scale members, said telescoping member carrying also a spirit-level which may be longitudinally adjustable thereof. Means are provided, furthermore, for clamping the elements of the telescoping member so that when the slide is extended beyond the body member, its position may readily be maintained.

In order to provide for a compact level member of this nature, the extending scale plates are arranged for pivotal mounting so that when the level is not in use the same may be folded over to lie substantially parallel to the level body and thus materially reduce the storage space required for the level.

The nature of the invention, however, will best be understood when described in connection with the accompanying drawings, in which:

Fig. 1 is a front elevation of the novel level member with scale members extended for use and with the drawn-out position of its slide indicated in dotted lines.

Fig. 2 is a plan thereof.

Fig. 3 is a front elevation of the novel level with scale plates folded.

Fig. 4 is a fragmentary rear elevation.

Figs. 5 and 6 are end elevations.

Fig. 7 is a vertical section taken on the line 7—7, Fig. 1 of the drawings, and looking in the direction of the arrows.

Referring to the drawings, 10 designates the base or body portion of the instrument having its undersurface 11 finished to a true plane; and the same is adapted to rest upon the object whose level is to be determined or corrected. The said body portion is constructed, preferably, of two side pieces held together by the end straps 12 and 13 and leaving an intermediate space for the reception of a graduated slide member 15. The latter carries a metal strip having the extending flange portions or tongues 16 extending laterally therefrom on opposite sides of the slide and designed to fit corresponding channels or grooves 17 of the side pieces constituting the body member. The slide is thus securely positioned in the latter and may be manually drawn outwardly to extend the effective length of the level, as indicated in the position shown in dotted lines, Fig. 1 of the drawings.

A pin 18, extending upwardly from the inner end of the slide member, limits by contact with the strap 13 the extent to which slide 15 may be drawn outwardly and thus also prevents its complete withdrawal from the body portion 10.

To the one end of said body portion there is also attached in manner to project at right angles thereto a scale plate 20 having the vertical slot 21; and, similarly, the slide 15 has secured thereto a scale plate 22 having the vertical slot 23. The zero graduations of these plates when the latter are located at right angles to the body portion lie in a plane parallel to the bottom surface 11; and a telescoping support member 24 is designed to be adjustably secured or clamped at its opposite ends to the respective scale plates. This may be accomplished, for example, by clamping screws 25 and 26 passing through the outer and pointer-shaped ends of the telescoping elements and extending as well through the respective slots 21 and 23 of the scale plates. By this expedient, the telescoping member 24 may be positioned at any desired angle, within the range of the instrument, to the surface 11; and said telescoping member is designed to carry a double spirit-level element 30 which may be adjustable along said member as by clamping the same thereto by means of a clamping screw 31.

When the slide 15 has been drawn out to the desired extent, its position may be secured by locking the telescoping portions of the member 24, for example, by means of the clamp 32 fitted over the split outer end of the tubular portion of the telescoping member.

In order to provide for compactness of the level as in storing the same when not in use or in the transportation of these levels, the scale plates 20 and 22 thereof are not connected directly to the body portion 10 and slide 15 but rather are pivoted to brackets 33 and 34 rigidly attached thereto, the clamping screws 25 and 26 serving to link the telescoping elements to the respective plates.

It will be understood that when the level is in use, these clamps will be tight and that when the plates are to be turned down and inwardly over the top surface of the body portion the said clamps are to be suitably loosened, as by manually unscrewing the same.

Furthermore, in order to fix the elevated position and accommodate this lowering motion, the lower and inner edges of each of the scale plates are partly cut away to an arcuate perimeter, the respective straight-away portions 35 and 36 of the bottom edges insuring the raised location.

By means of the arrangement hereinbefore described, the level may not only be extended double the length of the body portion, but, when not in use, may be reduced to a compact size, convenient for storage or shipment. Suitable graduations 37 and 38 are also provided respectively upon the body portion 10 and the slide 15 thereof to expedite setting the level to the desired length.

Furthermore, by setting one of the ends of the telescoping member 24 to the zero position, the amount that an object on which said level is placed is out of level may readily be determined by shifting the opposite end of said telescoping member until the bubble of the spirit-level 30 is centrally located, as is well understood, and then reading the position on the corresponding scale plate.

Provision has also been made for utilizing the level in plumb measurements in that transverse spirit-level elements 40 are provided with the spirit-level 30 and an adjustable scale plate 41 is movably mounted in the end of the body portion opposite its slide end to be manually moved to measure the particular setting. This plate or slide 41 is, for example, frictionally held to the end by a slotted cover plate 42, an actuating pin 43 being attached to the slide plate and projecting outwardly through the slot 44 of the cover plate for manual operation of said slide plate.

I claim:

1. An extensible spirit-level, comprising an elongated body portion, a slide member mounted therein for movement longitudinally thereof, a scale plate carried by the body portion and a scale plate carried by the slide member, a telescoping support comprising two elongated tubular members, one being of smaller diameter than the other and slidable therein, means for adjustably securing the free ends of the tubular members to the scale plates, and a spirit-level carried by said support.

2. An extensible spirit-level, comprising an elongated body portion, a slide member mounted therein for movement longitudinally thereof, a scale plate carried by the body portion and a scale plate carried by the slide member, a telescoping support comprising two elongated tubular members, one being of smaller diameter than the other and slidable therein, means for adjustably securing the free ends of the tubular members to the scale plates, a spirit-level carried by said support, and means to clamp the tubular members of the telescoping support to each other.

3. An extensible spirit-level, comprising an elongated body portion, a slide member mounted therein for movement longitudinally thereof, a scale plate carried by the body portion and a scale plate carried by the slide member, a telescoping support comprising two elongated tubular members, one being of smaller diameter than the other and slidable therein, means for adjustably securing the free ends of the tubular members to the scale plates, a spirit-level mounted upon said support, and means to adjustably secure said spirit-level to the support.

4. An extensible spirit-level, comprising an elongated body portion, a slide member mounted therein for movement longitudinally thereof, a scale plate carried by the body portion and a scale plate carried by the slide member, said scale plates being provided with slots normally at right angles to the undersurface of the body portion, a telescoping support comprising two elongated tubular members, one being of smaller diameter than the other and slidable therein, clamping screws adapted to secure the free ends of the tubular members to the scale plates and fitting through the respective slots thereof, and a spirit-level carried by said support.

5. An extensible spirit-level, comprising an elongated body portion, a slide member mounted therein for movement longitudinally thereof, a scale plate pivotally carried by the body portion and a scale plate pivotally carried by the slide member, means to secure said scale plates in a position at right angles to the body portion and including a telescoping support comprising two elongated tubular members, one being of smaller diameter than the other and slidable therein, means for adjustably securing the free ends of the tubular members to the scale plates, and a spirit-level carried by the said support.

In testimony whereof I affix my signature.

FRANK SIMON.